(12) United States Patent
Srinivasan et al.

(10) Patent No.: US 11,734,240 B2
(45) Date of Patent: Aug. 22, 2023

(54) PRESCRIPTIVE ANALYTICS BASED MULTI-TIER ELASTIC-POOL DATABASE REQUISITION STACK FOR CLOUD COMPUTING

(71) Applicant: Accenture Global Solutions Limited, Dublin (IE)

(72) Inventors: Madhan Kumar Srinivasan, Karnataka (IN); Guruprasad Pv, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 165 days.

(21) Appl. No.: 17/408,087

(22) Filed: Aug. 20, 2021

(65) Prior Publication Data
US 2023/0064694 A1 Mar. 2, 2023

(51) Int. Cl.
*G06F 16/00* (2019.01)
*G06F 16/21* (2019.01)
*G06N 20/00* (2019.01)
*G06F 16/28* (2019.01)

(52) U.S. Cl.
CPC .......... *G06F 16/217* (2019.01); *G06F 16/282* (2019.01); *G06N 20/00* (2019.01)

(58) Field of Classification Search
CPC .. G06F 16/217; G06F 16/282; G06F 11/3433; G06F 2201/80; G06F 11/3409; G06F 11/3452; G06N 20/00
See application file for complete search history.

(56) References Cited

U.S. PATENT DOCUMENTS

| | | | | |
|---|---|---|---|---|
| 10,523,519 | B2* | 12/2019 | Srinivasan | G06F 9/45558 |
| 10,552,390 | B2* | 2/2020 | Anand | G06F 16/217 |
| 11,108,632 | B1* | 8/2021 | Srinivasan | H04L 41/16 |
| 11,379,442 | B2* | 7/2022 | Gandi | G06N 5/04 |
| 2017/0139833 | A1* | 5/2017 | Barajas Gonzalez | G06F 12/0862 |
| 2018/0329644 | A1* | 11/2018 | Das | G06F 3/0604 |
| 2019/0079848 | A1* | 3/2019 | Srinivasan | H04L 67/1012 |
| 2019/0087301 | A1* | 3/2019 | M | H04L 67/131 |
| 2020/0134423 | A1* | 4/2020 | Shinde | G06N 3/045 |
| 2020/0195571 | A1* | 6/2020 | Srinivasan | G06F 11/3452 |
| 2021/0081709 | A1* | 3/2021 | Chatelain | G06F 30/27 |
| 2021/0248024 | A1* | 8/2021 | Poola | G06F 11/0772 |
| 2021/0256066 | A1* | 8/2021 | Srinivasan | G06F 11/328 |
| 2021/0295987 | A1* | 9/2021 | Thomas | G16H 40/20 |
| 2021/0334191 | A1* | 10/2021 | Srinivasan | G06N 3/08 |
| 2021/0405903 | A1* | 12/2021 | Srinivasan | G06F 3/0653 |
| 2022/0012763 | A1* | 1/2022 | Sharma | G06N 3/048 |
| 2022/0300471 | A1* | 9/2022 | Srinivasan | G06F 11/3433 |
| 2022/0374283 | A1* | 11/2022 | Srinivasan | G06F 9/5044 |

* cited by examiner

*Primary Examiner* — Noosha Arjomandi
(74) *Attorney, Agent, or Firm* — Crowell & Moring, L.L.P.

(57) ABSTRACT

A multi-layer elastic requisition stack may generate pool requisition tokens for controlling requisition of pooled database-compute resources. The elastic requisition stack may determine candidate databases for inclusion in elastic pools by analyzing historical utilization data and generating predicted utilization data. Based on the historical and predicted utilization data, the elastic requisition stack may determine multiplexing characteristics for the candidate databases and complement factors among the databases. The elastic requisition stack may compare unpooled database performance to pooled database performance to determine whether to pool the candidate databases.

20 Claims, 6 Drawing Sheets

PRESCRIPTIVE ANALYTICS BASED MULTI-TIER ELASTIC-POOL DATABASE REQUISITION STACK FOR CLOUD COMPUTING

TECHNICAL FIELD

This disclosure relates to database-compute tier requisition via a prescriptive analytics based tier requisition stack.

BACKGROUND

Rapid advances in communications and storage technologies, driven by immense customer demand, have resulted in widespread adoption of cloud systems for managing large data payloads, distributed computing, and record systems. As one example, modern enterprise systems presently maintain data records many petabytes in size in the cloud. Improvements in tools for cloud resource allocation and consumption prediction will further enhance the capabilities of cloud computing systems.

DETAILED DESCRIPTION

Figure 1:
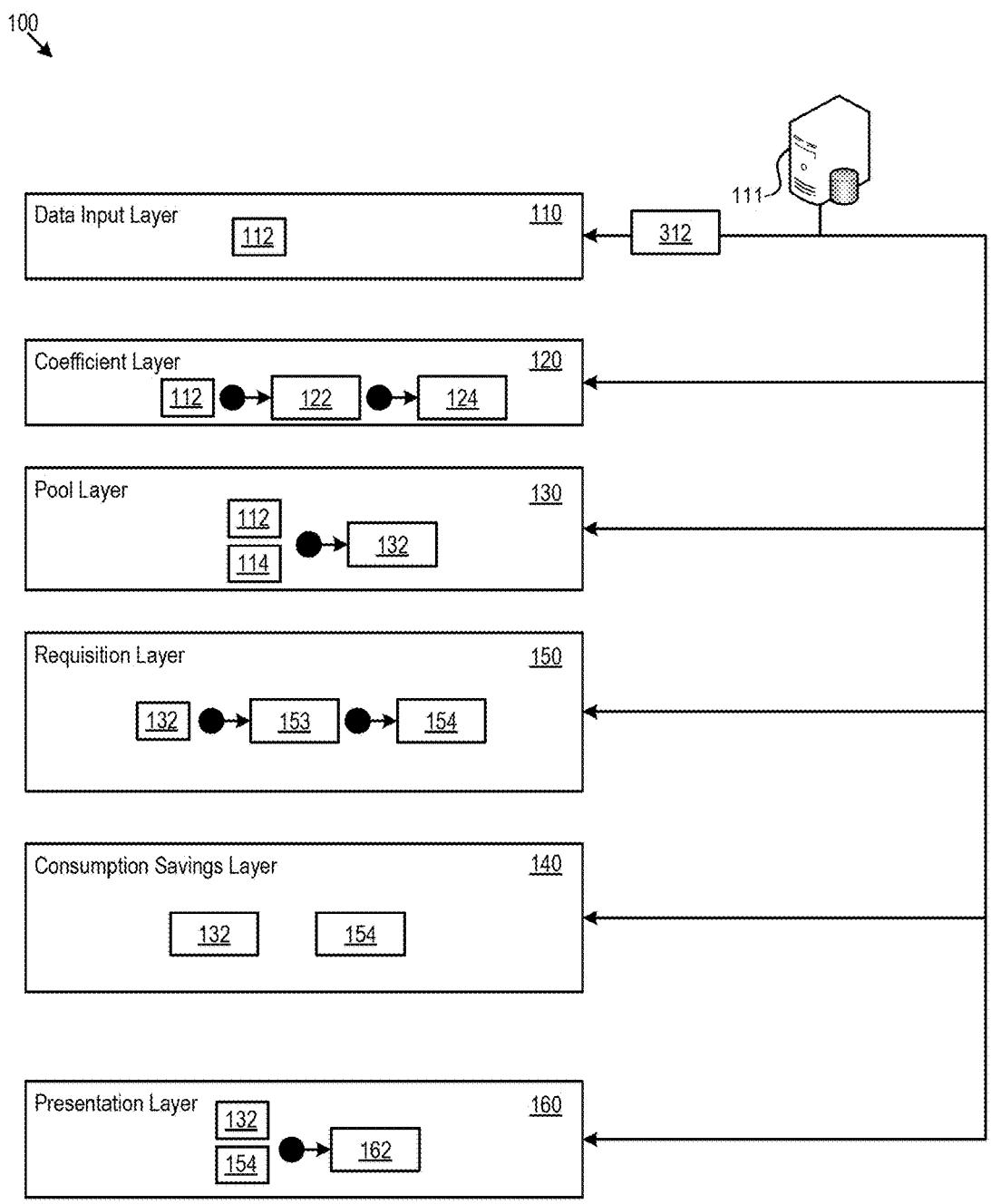
FIG. 1 shows an example multiple-layer elastic requisition stack.

In cloud computing systems, database-compute resources (e.g., database processor resources, data transaction resources, database connection resources, data transfer throughput resources, or other database-compute resources) may be requisitioned e.g., from database-compute providers such as Azure or other database systems. Various different implementations may provide tiered database-compute offerings where the various tiers provide database-compute resources covering various activity levels as indicated by activity factors. Activity factors may be determined using a combination (e.g., weighted sum, weighted average, sum average, or other weighted/non-weighted combination) of database-compute data type activity coefficients (e.g., indications of database-compute activity in various types, such as processor utilization data types, database-compute operation-rate data types, flush volume data types (e.g., log flush), and/or other database-compute activity data types).

In some cases, a requisition at a particular data tier may represent on underprovision or overprovision of an allowed activity for a particular database-compute system. Although, for example, a given tier may accommodate activity levels for one type of activity. For example, a requisitioned database-compute tier may appropriately support one or more activity level types for a given system. However, other activity types may not necessarily be adequately supported. For example, a given database-compute tier may offer activity levels that reflect processor utilization activity levels, but inadequately address activity levels as indicated by log flush data and/or operation-rate (e.g., database connection/session/transaction operate-rates). In another example, a flush data alone might indicate an activity level that is unduly high given comparatively low processor activity for the example system. Thus, consideration of multiple indications of activity level may reduce the risk of underprovision or overprovision. Further, resources dedicated to the overprovisioning of the requisitioned database-compute tier (that does not improve computing performance) could instead be applied to other computing resources that may improve computing performance of the system (as a whole) including, in some cases, non-database compute computing resources. Conversely, an underprovisioned database-compute tier may be operated continually at (or over) capacity and may be unable to fulfill database-compute operations without latency, connection/session backlog accumulation, or other degraded performance. Accordingly, an overprovisioned or underprovisioned database-compute tier may lead to performance degradation or inefficient deployment of hardware resources.

Accordingly, increased database-compute tier requisition accuracy provides a technical solution to the technical problem of system inefficiency by increasing the utilization and efficiency of cloud-based database-compute system.

In addition to tier provisioning, databases may share database-compute resources in elastic pools. Because simultaneous peak activity for different databases may be a rare coincidence in some database use contexts, multiple different databases with similar peak database-compute usage (e.g., maximum utilization, above threshold utilization, or other peak utilization) may be multiplexed on to the same pool of database-compute resources. Similar to the efficiencies gained through the statistical multiplexing of multiple television and/or data streams on to single communication channels, multiplexing databases on to a shared set of computing resources allows multiple databases to be serviced with peak database-compute resources that are less than the sum of all the peaks of the individual multiplexed databases. For example, if a first database has a short peak of 100% utilization and 0% utilization at all other times, it may be multiplexed with a second database that also has a short peak of 100% utilization and 0% at all other times. Rather, than using a database-compute capacity double that of the two databases, the multiplexed databases can operate with the same database-compute capacity as a single one of individual databases, assuming the two 100% peaks do not overlap in time.

Accordingly, the architectures and techniques discussed improve the efficiency of the underlying hardware of database-compute systems by prescriptively identifying candidate databases for multiplexing into elastic pools. Further the architectures and techniques discussed solve the technical problem of under-utilized provisioned database-compute resources through application of statistical multiplexing (e.g., selection and aggregation of candidate databases into elastic pools).

The tier requisition stack techniques and architectures described in U.S. patent application Ser. No. 16/897,906, filed Jun. 10, 2020, titled Prescriptive Analytics Based Multi-Parametric Database-Compute Tier Requisition Stack for Cloud Computing, and incorporated by reference in its entirety herein, may be used to prescribe database-compute tier requisitioning. The tier requisition stack described therein may provide prescriptive analytical database-compute tier correction taking into account allowed database-compute operation-rates, processor utilization patterns, flush data, concurrent session data, concurrent request data, online transaction processing (OLTP) storage requirements, and/or other data. Thus, the disclosed tier requisition stack techniques computing efficiency/accuracy and provide an improvement over existing solutions. Further, the tier requisition stack techniques and architectures provide a practical solution to the technical problem of efficient storage volume provision. Accordingly, activity factors, database-compute tolerances, and/or other factors used in database-compute tier selection may be determined by implementing the tier requisition stack described therein.

Additionally or alternatively to database-compute tier selection, databases may be aggregated into elastic pools that share database-compute resources. Elastic requisition stack architectures and techniques may use historical data which may include allowed database-compute operation-rates, processor utilization patterns, flush data, and/or other data; and tolerance data that may include concurrent session data, concurrent request data, online transaction processing (OLTP) storage requirements, and/or other data. In some implementations, the elastic requisition stack architectures and techniques may analyze expenditure report data (e.g., consumption metric data) for database-compute resource use: processor activity, memory usage history, storage volume input/output operation history. Furthermore, layers (such as predictive engine layers) may use computing cycles, data throughput, or other utilization metrics, seasonal usage cycles e.g., holiday schedules, daily usage cycles, weekly usage cycles, quarterly usage cycles or other data to forecast future usage. Additionally or alternatively, consumption metric data may include computing resource specific cost metrics such as expenditure-per-time or resource-per-time metrics.

FIG. 1 shows an example multiple-layer elastic requisition stack 100, which may execute on elastic requisition circuitry making up the hardware underpinning of the elastic requisition stack 100. In this example, the elastic requisition stack 100 includes, a data input layer 110, a candidate layer 120, a pool layer 130, a requisition layer 150, a consumption savings layer 140, and a presentation layer 160. The elastic requisition stack 100 may include a multiple-layer computing structure of hardware and/or software that may provide prescriptive analytical recommendations (e.g., prescriptive allowed operation-rates) through data analysis.

A stack may refer to a multi-layered computer architecture that defines the interaction of software and hardware resources at the multiple layers. The Open Systems Interconnection (OSI) model is an example of a stack-type architecture. The layers of a stack may pass data and hardware resources among themselves to facilitate data processing. As one example for the elastic requisition stack 100, the data input layer 110 may provide the candidate layer 120 with data access resources to access historical data-types e.g., via storage and/or network hardware resources. Hence, the data input layer 110 may provide a hardware resource, e.g., memory/network access resources, to the candidate layer 120. Accordingly, the multiple-layer stack architecture of the elastic requisition stack may improve the functioning of the underlying hardware.

Figure 2:
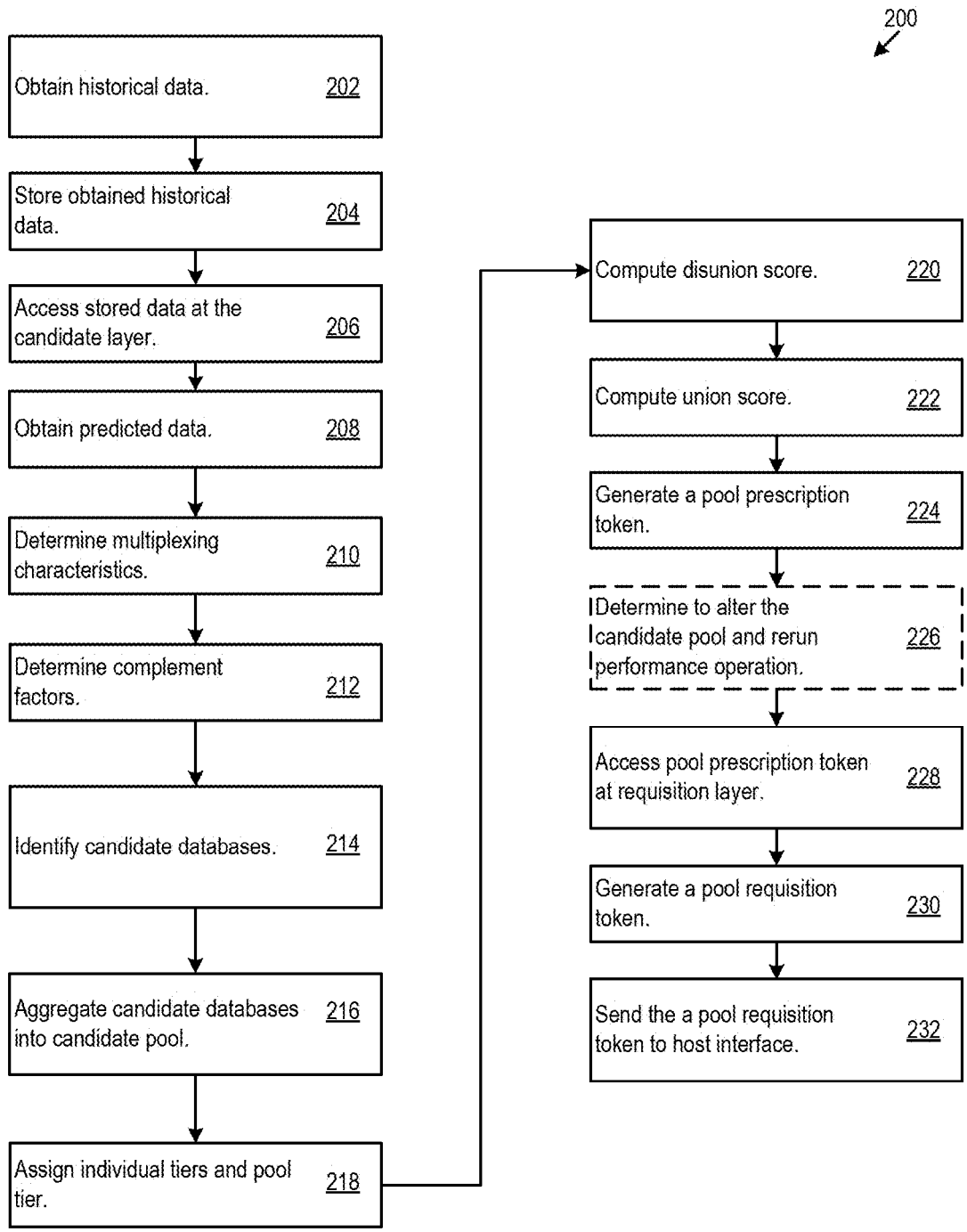
FIG. 2 shows example elastic requisition stack logic.

In the following, reference is made to FIG. 1 and the corresponding example elastic requisition stack logic (ERSL) 200 in FIG. 2. The logical features of ERSL 200 may be implemented in various orders and combinations. For example, in a first implementation, one or more features may be omitted or reordered with respect to a second implementation. At the input layer 110 of the elastic requisition stack 100, the ERSL 200 may obtain historical data 112 (202) and then store the historical data 112 (204). In some cases, historical data 112 may be received via communication interfaces (e.g., communication interfaces 312, discussed below). The historical data 112 may be accessed at least in part, e.g., via the communication interfaces 312, from data sources 111, which may include, database-compute utilization history databases, cloud expenditure databases, master virtual machine cost databases, use-history databases, storage access logs, virtual machine family/template description data, or other data sources. The historical data 112 may be provided by database-compute history databases, cloud expenditure databases, committed-use history databases, or other utilization data sources. The further data to support analysis may be provided by client preferences, service logs, description data, queries, or other database-compute data sources. Consumption metric data, as discussed below, may be obtained from cloud expenditure databases, master database-compute cost databases, expenditure histories, or other consumption metric data sources.

After the historical data, including various data types, such as processor utilization type data detailing processor usage over time, operation rate date detail rates and time-transaction-densities of database-compute operations/transactions, flush data detailing flushes of logs or other flushes, and/or other data, is obtained and stored the ERSL 200 at candidate layer of the elastic requisition stack may access the historical data (206).

The ERSL 200 may, at the candidate layer 120 of the elastic requisition stack, perform a deep-learning analysis of the historical data to obtain predicted utilization data 122 (208). For example, the candidate layer 120 may train a deep-learning (or other machine-learning algorithm) using the historical data. The trained algorithm may then be used to predict future utilization data for each of the data types. The predicted utilization data may be used to determine a predicted mapping for the data types. The predicted mapping may be used to determine a predicted activity factors and/or database-compute tiers. The predicted database-compute tier 164 may be used to determine a future tier recommendation for selection of similarly-tiered candidates for elastic pools and/or comparison of individual compute performance against pooled performance.

In some cases, the forecasted utilization data accuracy may fall below a desired level. After training a model (such as a deep learning model or machine learning model), the ERSL 200 may determine accuracy be generating predicted utilization data for a past period for which historical utilization data is available or later comparing predicted future values to eventual measured values. In some cases, recent historical data may be compared to upcoming predicted data (such as in the pseudocode below). The ERSL 200 may compare the predicted data to the measured/historical data and determine the accuracy of the model. Other measure of accuracy may be used, for example model confidence measures or other accuracy measures. When the accuracy of the model falls below a desire level (for example, an accuracy threshold) the ERSL 200 may forgo reliance on predicted utilization data from the candidate layer. The ERSL may also determine a historical mapping based on historical data.

In some implementations, the ERSL 200 may perform a context-based machine learning model selection. For example, a deep learning model may be selected when a single utilization metric (or number below a defined threshold) is being predicted. For example, a tree-based algorithm may be selected when multiple utilization metrics (or number above a defined threshold) are being predicted. In some cases, other combinations of models and conditions may be defined for the context-based model selection. For example, for upper and/or quantiles this context-based selection may rely on selection of the model with the lowest quantile loss function.

The ERSL 200 may, based on the historical data and the predicted (e.g., forecasted) data, determine historical and predicted multiplexing characteristics for databases that may potentially be pooled (210). In some cases, multiplexing characteristics may include ratios of peak database-compute utilization to average (e.g., mean, median, inner quartile, or other average metric) database-compute utilization. Databases for which provisioned database-compute resources go used for a majority of the evaluation period may have potential for efficiency increase through multiplexing with other such databases. In some cases, databases with sparse (e.g., from a mathematical standpoint) peaks may have potential for efficiency increase because the chance of peak utilization coincidence for mathematically sparse systems is low.

After determining historical and predicted multiplexing characteristics for the databases that may be potentially pooled, the ERSL 200 may determine complement factors 124 among the databases (212). Complement factors may include features of the activity mappings and/or multiplexing characteristics that may cause two or more databases to be well-suited complements for multiplexing for one another. For example, a complement factor may include a determination that two or more databases have similar peak-to-average utilization ratios. For example, a complement factor may include a determination that two or more databases a level of mathematical sparseness that would facilitate multiplexing the two or more databases while keeping the probability of peak coincidence below a threshold level. For example, a complement factor may include the determination that two databases exhibit time-based orthogonality in usage. For example, a first database may have peaks only at night (or other identifiable period) while a second database (with usage orthogonal to the first) only has peaks during the day (or outside of the identifiable period). A complement factor may include features between two or more databases that are consistent with efficiency gain through statistical multiplexing of the databases on to shared database-compute resources.

Based on the multiplexing characteristics (e.g., predicted and/or historical) and complement factors, the ERSL 200 may identify multiple candidate databases for inclusion into a candidate pool (214). The ERSL 200 may aggregate the multiple candidate databases to the candidate pool (216) for pooled analysis.

Table 1 shows example pseudocode for selection of candidate databases based on historical data.

TABLE 1

Selection of Candidate Databases based on Historical Data

Historical Selection Criteria ($\phi$) = IF ((($\pi >= \Omega$) & ($\delta >= \Omega$)) & (($\mu >= \chi$) & ($\rho >= \chi$)) THEN
"Candidate Selected" ELSE "Not Selected") - EQUATION 1A
Where,
$\pi$ = Max database-compute/Average database-compute utilization ratio (90-day window)
$\Omega$ = Tunable Parameter. Recommended Value = 1.5
$\delta$ = Max Concurrency/Average Concurrency utilization ratio (90-day window)
$\mu$ = Max database-compute/$90^{th}$ Percentile database-compute utilization ratio (90-day window)
$\chi$ = Tunable Parameter. Recommended Value = 1.4
$\rho$ = Max Concurrency/$90^{th}$ Percentile Concurrency utilization ratio (90-day window)

Table 2 shows example pseudocode for selection of candidate databases based on predicted data.

TABLE 2

Selection of Candidate Databases based on Predicted Data

Predicted Selection Criteria ($\phi$Pred) = IF ((($\pi$Pred >= $\Omega$) & ($\delta$Pred >= $\Omega$)) & (($\mu$Pred >= $\chi$) & ($\rho$Pred >= $\chi$)) THEN "Candidate Selected" ELSE "Not Selected")
[Such that the Quantile loss is <= $\xi$Quantile Loss] - EQUATION 1B
Where,
$\pi$Pred = Max database-compute/50th percentile predicted database-compute utilization ratio (90-day window)
$\Omega$ = Tunable Parameter. Recommended Value = 1.5
$\delta$Pred = Max Concurrency/50th percentile predicted Concurrency utilization ratio (90-day window)
$\mu$Pred = Max database-compute/90th Percentile Predicted database-compute utilization ratio (90-day window)
$\chi$ = Tunable Parameter. Recommended Value = 1.4
$\rho$Pred = Max Concurrency/90th Percentile Predicted Concurrency utilization ratio (90-day window)
$\xi$Quantile Loss = Threshold for Quantile Loss Table 3 shows example pseudocode for selection of candidate databases based on a combined data.

TABLE 3

Selection of Candidate Databases based on Combined Data

Final Selection Condition = If (($\phi_{Pred}$ = "Candidate Selected" & $\phi$ = "Candidate Selected") THEN "Candidate Selected" ELSE "Not Selected") - EQUATION 1C For each of multiple candidate databases, ERSL 200 may determine a database-compute tier based on the corresponding activity factors of the individual databases (218). Then, the ERSL 200 may assign a database compute pool tier consistent with the individual tiers (218). For example, in various cloud systems, the candidate pool tier may be equal to or greater than the tier of the highest tier individual candidate database in the pool. For example, setting the candidate pool tier equal to or greater than the tier of the highest tier individual candidate database in the pool may allow for sufficient database-compute resources to meet the demand created by highest tier individual candidate database. In some cases, the candidate pool tier may be set greater than the tier of the highest tier individual candidate database to account for a probability of peak utilization coincidence among the pooled databases.

Table 4 shows example pseudocode for tier selection.

TABLE 4

Tier Selection i = Class (n)
$\Sigma$ (Max database-compute) = $\xi$Pool(i) - EQUATION 2A (Max cumulative database-compute for 90 day window for the pool)
i = Class1
i = Class (n)
$\Sigma$ (Max Concurrency) = $\tau$Pool(i) - EQUATION 2B (Max cumulative Concurrency for 90 day window for the pool)
i = Class1
i = Class (n)
$\Sigma$ (Storage) = $\Psi$Pool(i) - EQUATION 2C (Cumulative Storage for the pool)
i = Class1
Pool Tier Recommendation ($\sigma$edatabase-compute_TierIndex(i)) =
If ($\kappa$Low_TierIndex(i) <= $\xi$Pool(i) <= $\kappa$High_TierIndex(i) THEN "TIER_INDEX(i)" ELSE "NOT APPLICABLE" - EQUATION 2D
Pool Tier Recommendation ($\sigma$eConcurrency_TierIndex(i)) = If ($\lambda$Low_TierIndex(i) <= $\tau$Pool(i) <= $\lambda$High_TierIndex(i) THEN "TIER_INDEX(i)" ELSE "NOT APPLICABLE" - EQUATION 2E

TABLE 4-continued

Tier Selection

Where,
κLow_TierIndex(i) = Lower database-compute limit for the identified database-compute Tier
κHigh_TierIndex(i) = Upper database-compute limit for the identified database-compute Tier
λLow_TierIndex(i) = Lower Concurrency limit for the identified database-compute Tier
λHigh_TierIndex(i) = Upper Concurrency limit for the identified database-compute Tier At the pool layer 130, the ERSL 200 may compare the database-compute performance of the candidate pool versus the individual candidate databases. To perform the comparison, the ERSL 200 may perform a performance score operation by computing a disunion score (220) and a union performance score (222). A performance score may be based on the amount of database-compute resources allocated to service an individual database or pool of databases. In some cases, an allocation of more computing resources may make a performance score worse. As discussed herein, a first performance score that 'exceeds' a second performance score is better than the second, regardless of the way a particular scoring system attaches raw numbers to performance. The calculation of the performance score may be based on the determined database-compute tiers of the individual databases. In some cases, the performance score may take into account consumption metric data.

In some cases, because pooling may allow shared database-compute resources, resources that experience dynamic usage (e.g., processing, random access memory (RAM), concurrent connections, or other dynamic use resources may have more efficiency gains relative to shared static resources, such as storage. In an illustrative example scenario, five databases may readily share the peak processing capacity of a single database because the five databases may not necessarily utilize processor activity at some time (e.g., the databases may have dormant periods). The storage used by the databases may increase with their number, because (in the example scenario) the databases use storage at all times (regardless of whether the databases are active). In some cases, a pool may include additional storage (and/or other static resources) provisioning to account for this difference between static and dynamic use resources.

Table 5 shows example psedocode for determining storage demand.

TABLE 5

Storage Demand Determination i = Class (n)
Σ (Max database-compute) = ξPool(i) - EQUATION 2A (Max cumulative database-compute for 90 day window for the pool)
i = Class1
Extra Storage (vExtraStorage) = IF(ΨPool(i) <= Ø THEN 0 ELSEIF ((ΨPool(i) > Ø) OR (ΨPool(i) <= ØMax) THEN (ΨPool(i) - Ø) ELSE (ΨPool(i) - ØMax))) - EQUATION 3A
Storage Tier (vTier) = IF((vFamily = "Basic", vExtraStorage > 0) THEN "Next Basic Tier" ELSEIF ((vFamily <> "Basic" AND (vExtraStorage + Ø) <= ØMax) THEN σeDTU_TierIndex(i) ELSE "Next Tier")) - EQUATION 3B
Extra Storage Cost (vExtraStorageCost) = IF((vExtraStorage > 0 & vFamily = "Basic") then 0 ELSEIF ((vExtraStorage > 0 & vfAMILY = "Standard") THEN (0.221 * vExtraStorage) ELSEIF ((vExtraStorage > 0 & vFamily = "Premium") THEN (0.441 * vExtraStorage) ELSE 0))) - EQUATION 3C
Where, Ø = Included Storage for the Tier, ØMax = Max Storage for the Tier For the performance score operation, the ERSL 200 may compute a union performance score (222) that is based on the performance of the candidate databases while pooled. The calculation of the performance score may be based on the assigned database-compute tier of the candidate pool. In some cases, the performance score may take into account consumption metric data which may be separately defined for pooled operation.

When the union performance score exceeds the disunion score, the ERSL 200 may generate a pool prescription token 132 (224). A token may include a set requests or commands for a host interface for cloud computing requisition system. Thus, a token may include code, scripts, or other commands that requisition database-compute resources when sent to the host interface. The pool prescription token, may include a set of commands that requisitions the candidate pool in the form in which its performance score exceeded the disunion score for unpooled operation.

Table 6 shows example psedocode for determining database-compute performance for pooled operation and validation for database-compute tolerances.

TABLE 6

Pooled Performance Determination and Validation

Validation Check (VC1) = If ((ξPool(i) <= ØRecommended_DTU_Max) &
(τPool(i) <= ØRecommended_CONCURRENT_Max) & (ØNo_DB <= ØMax_No_DB_Pool) & (ΨPool(i) <= ØMax) THEN "Proceed for further analysis" ELSE "Reject Candidate") - EQUATION 4A
Where,
ØRecommended_DTU_Max = Maximum DTU limit for the recommended pool
ØRecommended_CONCURRENT_Max = Maximum Concurrency limit for the recommended pool
ØNo_DB = No of DB's in the pool
ØMax_No_DB_Pool = Maximum DB's allowed for the recommended pool
eDTU Validator (ß) = IF(VC1 = "Proceed for further analysis" THEN (ELSEIF ((ξPool(i) * ξBUFFER <= ØRecommended_DTU_Max) THEN "Accept" ELSE "Reject") ELSE "Reject")) - EQUATION 4B
eDTU Frequency Validator (θ) = IF(VC1 = "Proceed for further analysis" THEN (ELSEIF ((ξHigh_Utilization_Frequency/ξCount_DTU_Array) <= ØBuffer) THEN "Accept" ELSE "Reject") ELSE "Reject")) - EQUATION 4C
Where,
ξBUFFER and ØBuffer can be tuned. Recommended value is 10%
ξHigh_Utilization_Frequency = Number of DTU Utilization readings above 80% of ØRecommended_DTU_Max
ξCount_DTU_Array = No of DTU utilization readings
Final Decision = IF(Sum of Individual DB Rate > eDTU Pool Rate THEN "AcceptPool" ELSE "RejectPool")

When the disunion performance score exceeds the union performance score, the ERSL 200 may determine to alter the candidate pool and rerun the performance score operation (226). For example, for each iteration, the ERSL 200 may iteratively eliminate one or more of the candidate databases from the candidate pool and rerun the performance score operation (e.g., calculate new disunion and union performance scores each iteration) until a candidate pool for which the union performance score exceeds the corresponding disunion performance score.

Table 7 shows example pseudocode determining a candidate database for elimination from candidate pool.

TABLE 7

Candidate Database Backward Elimination

Weighted Utilization Score (ω) = (($\xi_{Pool(i)}$ * 0.15) + (0.15 * $\xi_{P95}$) + (0.4 * $\xi_{Mean}$) + (0.3 * (1 + % of $\xi_{High\_Utilization\_Frequency}$) * $\xi_{Pool(i)}$)) -
EQUATION 5A
The DB with the highest ω is eliminated from the pool till we reach ACCEPT code in 4A and 4B In some cases, the individual candidate databases may be assigned an inclusion rank (e.g., a rank based on the multiplexing characteristics of the candidate database and/or the complement factors to which the candidate database contributes). The ERSL 200 may, in some cases, eliminate candidate databases with lower inclusion ranks may be eliminated before those with higher inclusion ranks.

If no subset of the original candidate database can form a pool with a union score that exceeds the corresponding disunion score, the ERSL 200 may generate a prescriptive token that requisitions unpooled operation for the candidate databases.

At the requisition layer 150, ERSL 200 may access the pool prescription token (228). In some cases, as discussed below, the requisition layer 150 may pass the token to the presentation layer for generation of command interfaces to facilitate operator review of the elastic pool requisitions.

Table 8 shows an illustrative example implementation pseudocode for execution of an example system to determine elastic database computer tiers and pools in an example Microsoft Azure computing environment. However, other environments may be used.

TABLE 8

Illustrative Example Implementation Pseudocode

Input: Utilization Db, Billing Db, Cost Db, Features DB
Output: Pooling Recommendations for each DTU DB class
Step0: Load Azure Master Cost File
Step0a: Azure Intelligent Cost File Generation
Step1: Load the input files
Step2: Cleanse the data
Step2a: Select the required variables for analysis
Step2b: Rename the variables
Step2c: Format the variables (date, numeric and string)
Step3: Computing the maximum utilization
Step3a: for each resource id (1, n) sort utilization value by date and value
Step3b: for each resource id (1, n) select maximum value for each hour
Step4: Filtering billing data for relevant DTU db tiers
Step5: Merge Utilization, Billing, Cost Files and Feature File
Step5a: Merge Utilization and Billing files by resource id
Step5b: Merge the output of Step5a with the Cost file (to get the cost info for DTU at specific region)
Step6: Calculating the nth percentile utilization value
Step6a: Calculate the nth percentile (typically 90th and 95th) values for DTU and Concurrent Requests for each resource id (1, n)
Step6b: Calculate the mean values for DTU and Concurrent Requests for each resource id (1, n)
Step7: Candidate Selection based on Historical data - Equation 1A
Step7a: Using the Maximum, 90th percentile and Average utilization analysis for each resource id (1, n), select the databases that have sporadic high utilization
Step8: Candidate Selection based on ML Predictions - Equation 1B
Step8a: Select the right algorithm from and ensemble of algorithms depending on the "percentile" to be predicted and the number of variables in the prediction equation
Step8b: Compute the 50th, 90th and the 100th percentile values on a moving window basis for the next 15 days
Step8c: Select the candidates bases on the utilization pattern within an accept "quantile loss"
Step9: Final selection criteria based on Historical and Predicted data - Equation 1C TABLE 8-continued Illustrative Example Implementation Pseudocode Step10: Pooling Selection: Computing the Pools within Class - Equation 2
Step10a: Compute the Maximum "overlapping/concurrent" DTU and Concurrent Requests for the eDTU class/pool Equation 2A and 2B
Step10b: Compute the Consumed Storage for every identified eDTU pool Equation 2C
Step11: Pool Tier Identification: - Equation 2D/2E
Step11a: Based on the Computed values in equation 2A and 2B, identify the precise Index for the DTU and Concurrent Requests at pool level
Step12: Extra Storage Provisioning, Tier and Cost Computations: - Equation 3
Step12a: Compute the extra storage (if required) for the proposed pool tier over and above the included/default storage - Equation 3A
Step12b: Depending on the identified Pool Tier and the used storage, identify the Storage Tier - Equation 3B
Step12c: Compute the extra storage cost as computed by equation 3A and 3B - Equation 3C
Step13: Utilization Matrix Analysis (UMA) - Equation 4
Step13a: Initial Candidate selection based on Utilization and Pool constraint analysis - Equation 4A
Step13b: Level 1 validator based on maximum observed cumulative eDTU for the pool (inclusive of buffer) - Equation 4B
Step13c: Level 2 validator based on frequency of high concurrent eDTU values for the pool (inclusive of buffer) - Equation 4C
Step14: Backward Utilization Elimination (BAE) - Equation 5
Step14a: The DB with the highest ω is eliminated from the pool till we reach ACCEPT code in 4A and 4B - Equation 5A
Step15: Final Pool Tier Selection - Equation 6

In various implementations, responsive to the pool prescription token, the ERSL 200 may receive one or more finalization directives. The finalization directive 153 may, for example, include commands received from an operator via a pool requisition (PR)—command interface 162 generated at the presentation layer 160. The commands may change and/or confirm the selection of the candidate pool. The finalization directive may, for example, include feedback-based machine-learning-trained (e.g., using various machine-learning schemes, deep-learning, neural networks, and/or other machine-learning schemes) adjustments to the candidate pool. The feedback (on which to base the machine-learning training) may include operator commands, for example, those received at the PR-command interface 162.

Based on the finalization directive 153, ERSL 200 may generate a pool requisition token 154 (230). The pool requisition token 154 may, in some cases, designate a request for a pool identical to that in the pool prescriptive token. In some cases where the finalization directive indicates a change relative to the pool prescriptive token, the pool requisition token 154 may designate a request for a pool that differs from that in the pool prescriptive token.

After generating the pool prescriptive token 154, the ERSL 200 may send the pool requisition token 154 (232) to a host interface that controls reservation and/or requisition of data-compute resources to execute the request for the pooled databases.

In some implementations, ERSL 200, at the consumption savings layer 140, may obtain consumption metric data to determine a consumption rate/level for unpooled and/or pooled operation for a given set of candidate databases in a candidate pool. The ERSL 200 may compare consumption for pooled and unpooled operation to determine a pool consumption savings for transitioning to pooled operation.

Figure 3:
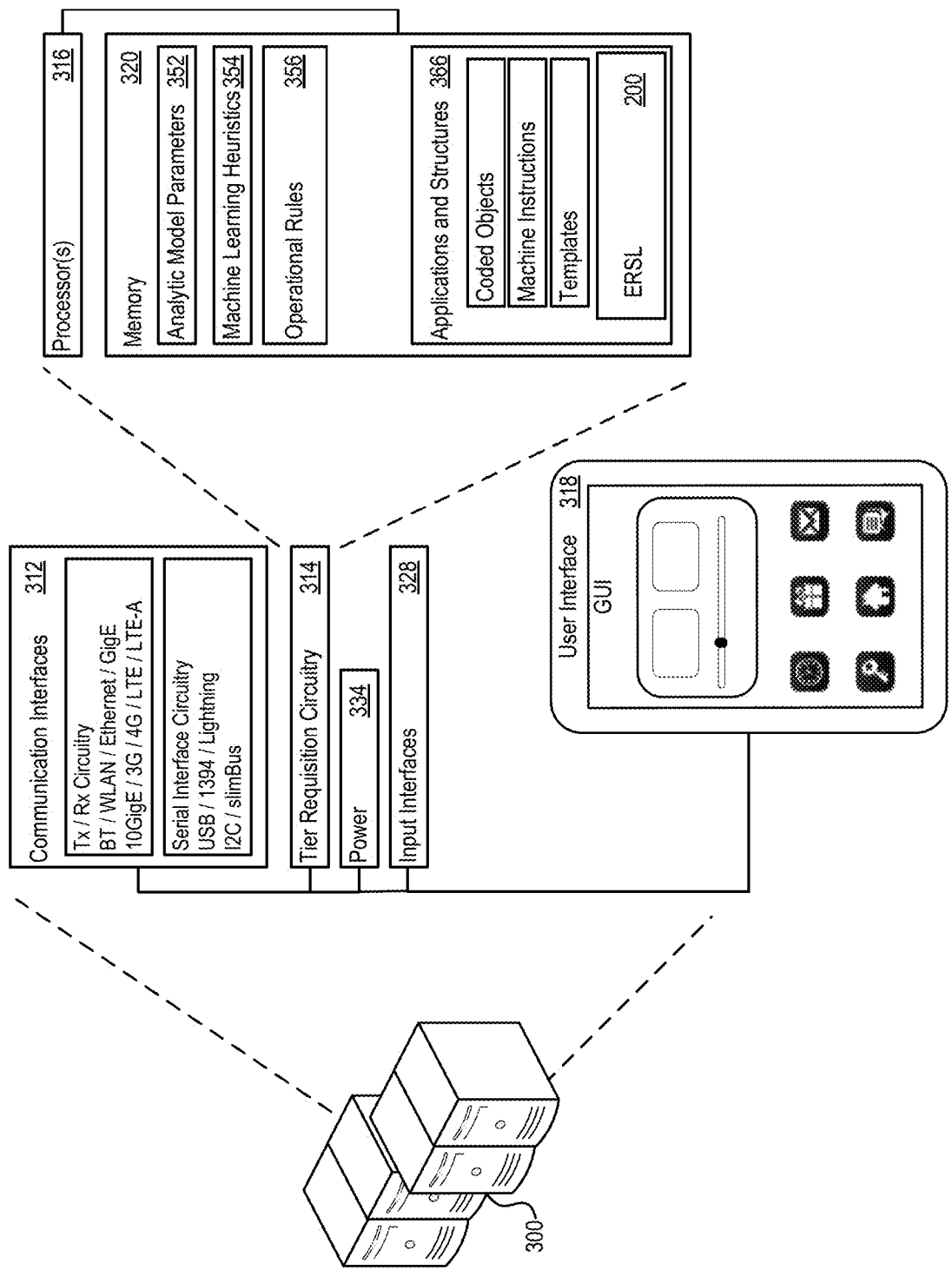
FIG. 3 shows an example specific execution environment for the elastic requisition stack.

FIG. 3 shows an example specific execution environment 300 for the tier requisition stack 100 described above. The execution environment 300 may include tier requisition circuitry 314 to support execution of the multiple layers of elastic requisition stack 100 described above. The tier requisition circuitry 314 may include processors 316, memory 320, and/or other circuitry.

The memory 320 may include analytic model parameters 352, machine learning heuristics 354, and operational rules 356. The memory 320 may further include applications and structures 366, for example, coded objects, machine instructions, templates, or other structures to support historical data analysis, pool candidate selection/evaluation or other tasks described above. The applications and structures may implement the ERSL 200.

The execution environment 300 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used to support and/or implement remote operation of the PR-command interface 162. The execution environment 300 may include power functions 334 and various input interfaces 328. The execution environment may also include a user interface 318 that may include human-to-machine interface devices and/or graphical user interfaces (GUI). The user interface 318 may be used to support and/or implement local operation of the PR-command interface 172. In various implementations, the elastic requisition circuitry 314 may be distributed over one or more physical servers, be implemented as one or more virtual machines, be implemented in container environments such as Cloud Foundry or Docker, and/or be implemented in Serverless (functions as-a-Service) environments.

In some cases, the execution environment 300 may be a specially-defined computational system deployed in a cloud platform. In some cases, the parameters defining the execution environment may be specified in a manifest for cloud deployment. The manifest may be used by an operator to requisition cloud based hardware resources, and then deploy the software components, for example, the elastic requisition stack 100, of the execution environment onto the hardware resources. In some cases, a manifest may be stored as a preference file such as a YAML (yet another mark-up language), JSON, or other preference file type.

Figure 4:
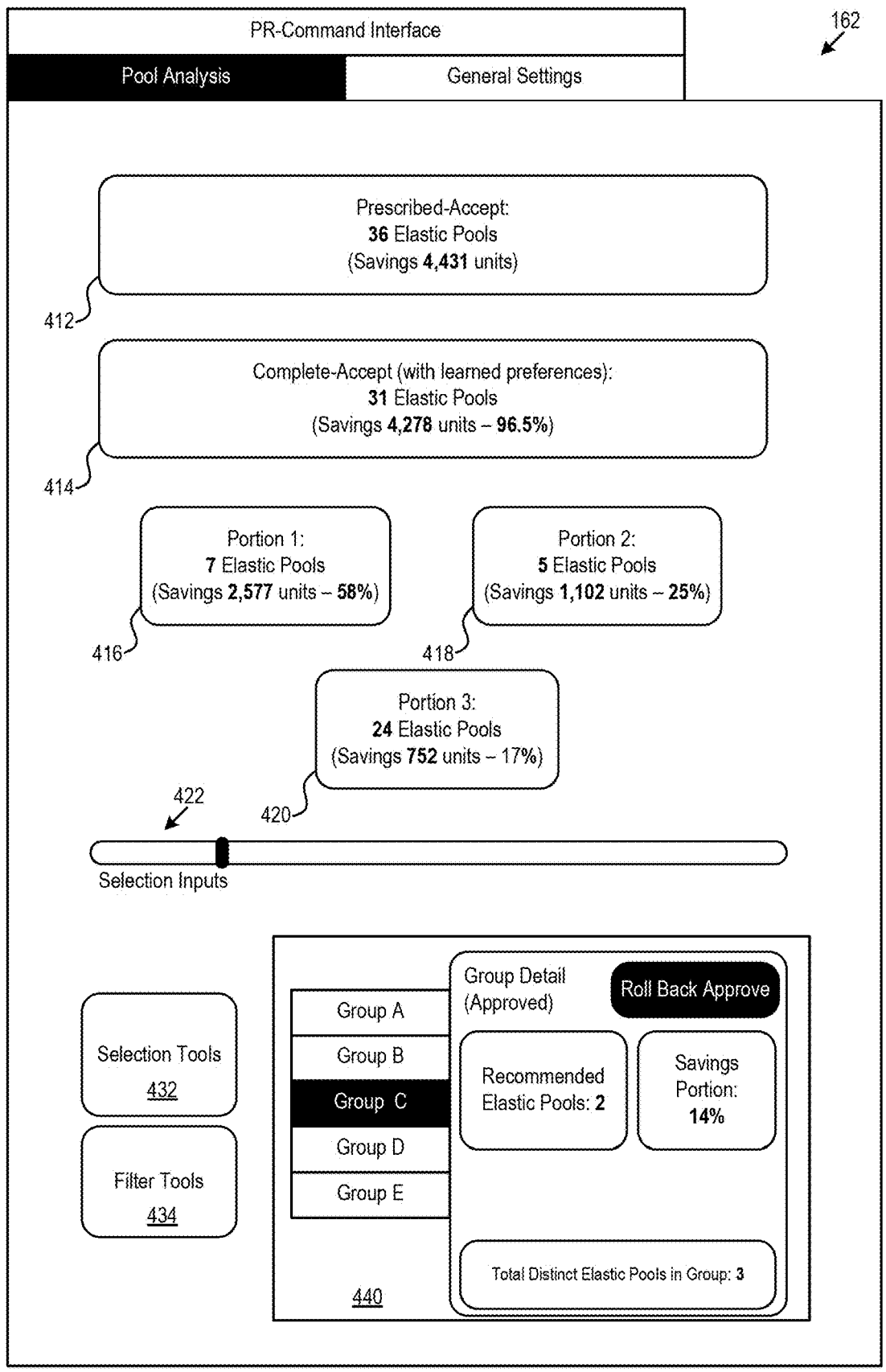
FIG. 4 shows an example pool requisition-command interface.

Referring now to FIG. 4, an example PR-command interface 162 is shown. The PR-command interface 162 may include multiple selectable options 412, 414, 416, 418, 420, 422 and data regarding the pool candidate selection/evaluation before and after alteration to accommodate the learned preferences of the operator. In this example scenario, the selectable options may include a prescribed-accept option 412 to implement some or all of the prescribed pool candidates (e.g., for multiple parallel analyses) as a group without alteration based on learned preferences, a complete-accept option 414 to implement the pool candidate selections (finalization directives) based on learned preferences, options 416, 418, 420 to implement augments to selected subsets of the pool candidates, option 422 to adjust preferences (e.g., selection inputs, threshold ratios, or other elastic requisition analysis inputs) and re-run the routine at the candidate and pool layers, or other selectable options to control finalized pool requisition token output.

Additionally or alternatively, the PR-command interface 162 may include selection and filter tools 432, 434 to support granular manipulation of the prescribed pool candidates, e.g., by resource region, by pool size; or other granular manipulation.

In some implementations, the PR-command interface 162 may include a group detail panel 440 for management of group-level selectable options such as group level approvals of prescribed pool candidates. Additionally or alternatively, the group detail panel 440 may display group-level information regarding prescribed pool candidates. The group detail panel 440 may also provide an option to roll back previously approved pools.

In the example, shown in FIG. 4, the options 416, 418, 420 allow for manipulation of selected subsets of the pools. For example, as shown the example routine in table two, the prescribed pool candidates may be "binned" into consumption savings classes. For example, "high", "medium", and "low" consumption savings bins may allow the operator to select specific groups prescribed pool candidates (e.g., as determined at the consumption savings layer 150). The options 416, 418, 420 show the respective portions of the total consumption savings that may be achieved by adjusting each specific subset of the prescribed pool candidates. In the example, the first subset option 416 provides the greatest marginal consumption savings, while the options 418, 420 provide successively smaller marginal consumption savings.

Figure 5:
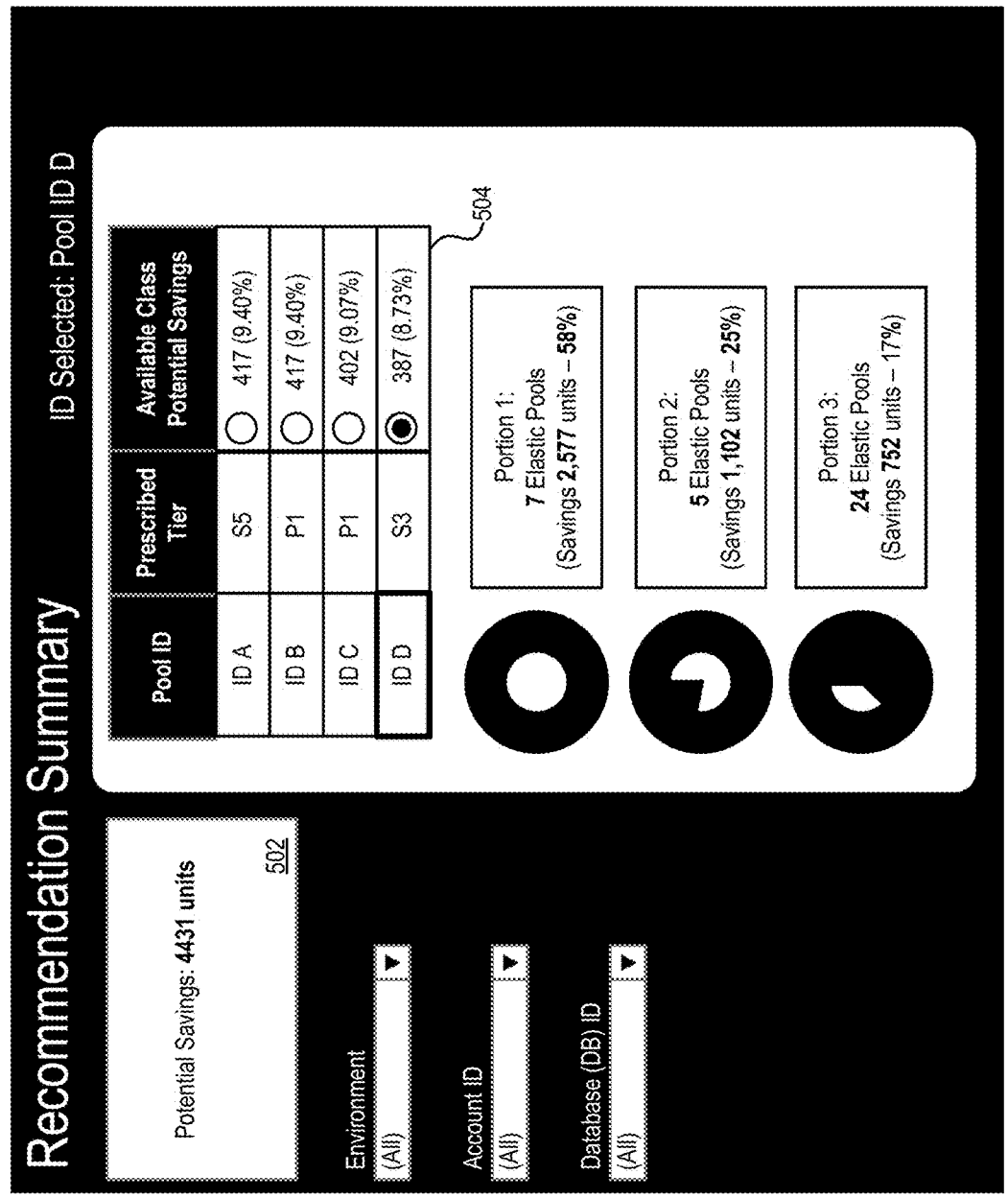
FIG. 5 shows a second example pool requisition-command interface.

FIG. 5 shows a second example PR-command interface 500. The second example PR-command interface 500 provides summary information panels 502 for overall efficiency achievements including consumption savings. The second example PR-command interface 500 may further provide detail information panels 504 with pool-identifier-specific details.

Figure 6:
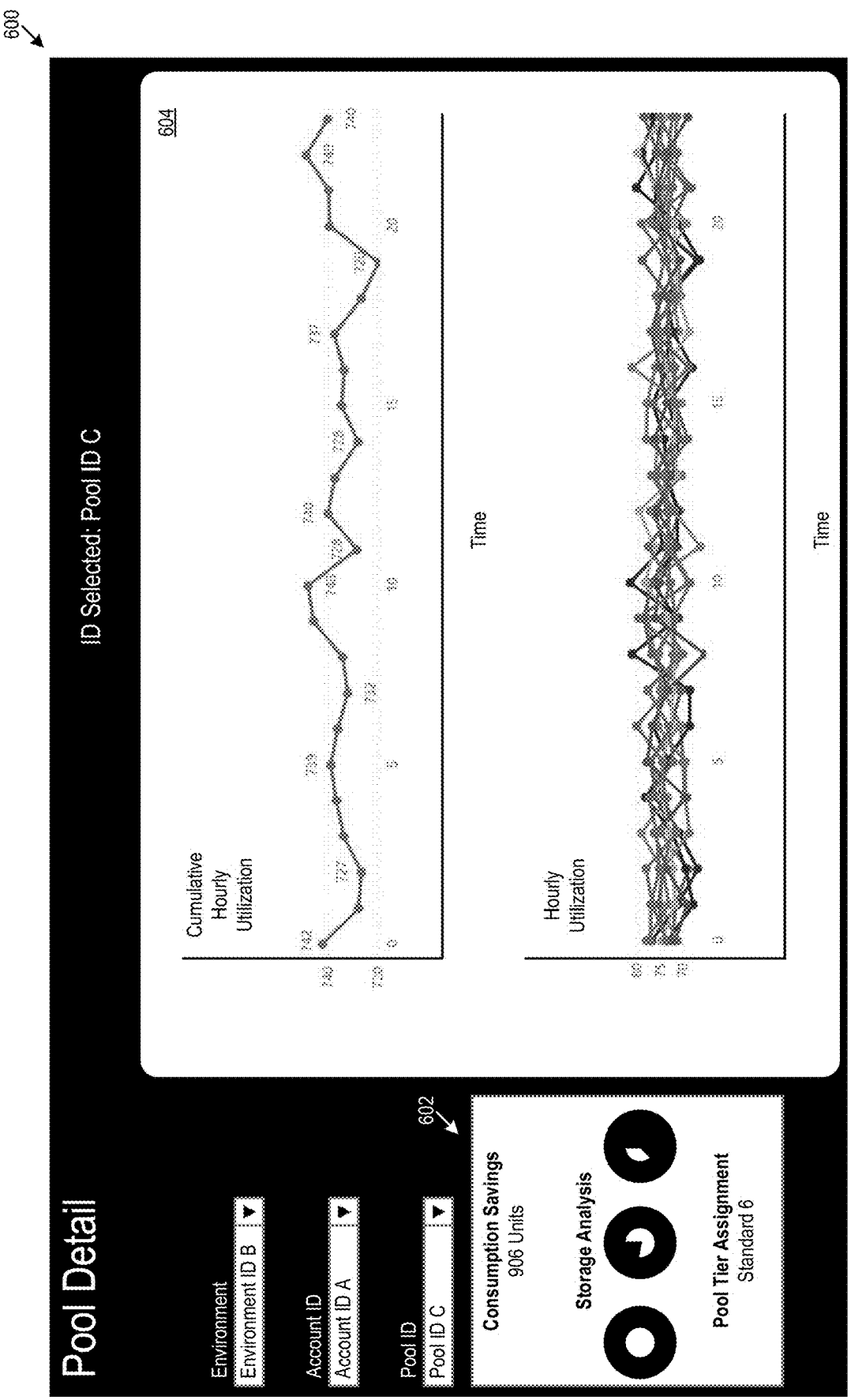
FIG. 6 shows a third example pool requisition-command interface.

FIG. 6 shows a third example PR-command interface 600. The third example PR-command interface 600 is pool identifier (e.g., a specific and/or unique designation for a given pooled resource) specific. The example PR-command interface may show a summary panel 602 that may include consumption savings or other details for the pool. The example PR-command interface may show a plot 604 of pooled database compute resources over time period that may include both historical and forecasted periods.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above. Table 9 includes various examples.

TABLE 9

| Examples |
| --- |
| E1. A system including: |
| elastic requisition circuitry configured to execute an elastic requisition stack, the elastic requisition circuitry configured to: |
| at a data input layer of the elastic requisition stack, obtain historical data including data types, the data types including processor utilization type data, operation rate type data, flush volume type data, or any grouping thereof; |
| at a candidate layer of the elastic requisition stack: |
| identify multiple candidate databases by: |
| obtaining a historical multiplexing characteristic for each of the multiple candidate databases via a map of the historical data; |
| via a deep-learning analysis of the historical data, obtaining a predicted multiplexing characteristic for each of the multiple candidate databases via a map of predicted activity; |
| identifying a complement factor from among the historical multiplexing characteristics; predicted multiplexing characteristics; or both for the multiple candidate databases, the complement factor consistent with a least one statistical multiplexing efficiency among the multiple candidate databases; and |
| aggregating the multiple candidate databases into a candidate pool based on the complement factor; |
| for each of multiple candidate databases, determine a database-compute tier based on a corresponding activity factor, the corresponding activity factor based on the historical data for the individual one of the multiple candidate databases; and |
| assign a candidate pool tier consistent with the database-compute tiers of the multiple candidate databases; |
| at a pool layer of the elastic requisition stack: |
| perform a performance score operation on the candidate pool by: |
| computing a disunion performance score for unpooled operation of the individual ones of the multiple candidate databases; |
| computing a union performance score for pooled operation of the multiple candidate databases; and |
| at a time that the union performance score exceeds the disunion performance score, generating a pool prescription token for requisition of the candidate pool including the multiple candidate databases; |
| at a requisition layer of the elastic requisition stack: |
| responsive to the pool prescription token, receive a finalization directive; and |
| based on the finalization directive, generate a pool requisition token; and |

TABLE 9-continued

| Examples |
| --- |
| network interface circuitry configured to send the pool requisition token to a host interface for control of database-compute resources. |
| E2. The system of example E1 or any other example in this table, where the elastic requisition circuitry is further configured to, at the pool layer: |
| at a time that the union performance score fails to exceed the disunion performance score: |
| perform a pool revision operation on the candidate pool by: determining a revised candidate pool by removing a first candidate database of the multiple candidate databases from the candidate pool; |
| perform the performance score operation on the revised candidate pool. |
| E3. The system of example E2 or any other example in this table, where the elastic requisition circuitry is further configured to, at the pool layer: |
| iteratively perform performance score operations and pool revision operations until: |
| union performance score exceeds the disunion performance score; or |
| a current candidate pool includes a single candidate database. |
| E4. The system of example E2 or any other example in this table, where the elastic requisition circuitry is further configured to, at the pool layer: |
| determine the first candidate database by identifying a lowest inclusion rank database of the multiple candidate databases. |
| E5. The system of example E4 or any other example in this table, where the elastic requisition circuitry is further configured to, at the candidate layer: |
| determine an inclusion rank for each of the multiple candidate databases based on: |
| the historical multiplexing characteristic for the candidate database; |
| the predicted multiplexing characteristic for the candidate database; |
| a complement factor relevant to the candidate database; or |
| any grouping thereof. |
| E6. The system of example E1 or any other example in this table, where the elastic requisition circuitry is configured to, at a predictive engine layer of the elastic requisition stack: |
| perform the deep-learning analysis of the historical data to obtain predicted utilization data including the data types; and |
| determine the map of predicted activity based on the predicted utilization data. |
| E7. The system of example E6 or any other example in this table, where the elastic requisition circuitry is configured to, at the predictive engine layer, perform the deep-learning analysis of the historical data by training a deep learning algorithm using the historical data to obtain predicted utilization data. |
| E8. The system of example E1 or any other example in this table, where the elastic requisition circuitry is configured to, at a consumption savings layer of the elastic requisition stack: |
| determine a pool consumption savings based on an amount by which the union performance score exceeds the disunion performance score. |
| E9. The system of example E8 or any other example in this table, where the elastic requisition circuitry is configured to, at a presentation layer of the elastic requisition stack: |
| generate an elastic-command interface for presentation of the pool consumption savings and an option for the finalization directive. |
| E10. The system of example E1 or any other example in this table, where the historical multiplexing characteristic, the predicted multiplexing characteristic, or both include a ratio of peak utilization to average utilization. |
| E11. A method including: |
| at elastic requisition circuitry configured to execute an elastic requisition stack: |
| at a data input layer of the elastic requisition stack, obtaining historical data including data types, the data types including processor utilization type data, operation rate type data, flush volume type data, or any grouping thereof; |
| at a candidate layer of the elastic requisition stack: |
| identifying multiple candidate databases by: |
| obtaining a historical multiplexing characteristic for each of the multiple candidate databases via a map of the historical data; |
| via a deep-learning analysis of the historical data, obtaining a predicted multiplexing characteristic for each of the multiple candidate databases via a map of predicted activity; |
| identifying a complement factor from among the historical multiplexing characteristics; predicted multiplexing characteristics; or both for the multiple candidate databases, the complement factor consistent with a least one statistical multiplexing efficiency among the multiple candidate databases; and |
| aggregating the multiple candidate databases into a candidate pool based on the complement factor; |

TABLE 9-continued

Examples for each of multiple candidate databases, determining a database-compute tier based on a corresponding activity factor, the corresponding activity factor based on the historical data for the individual one of the multiple candidate databases; and
assigning a candidate pool tier consistent with the database-compute tiers of the multiple candidate databases;
at a pool layer of the elastic requisition stack:
performing a performance score operation on the candidate pool by:
computing a disunion performance score for unpooled operation of the individual ones of the multiple candidate databases;
computing a union performance score for pooled operation of the multiple candidate databases; and
at a time that the union performance score exceeds the disunion performance score, generating a pool prescription token for requisition of the candidate pool including the multiple candidate databases;
at a requisition layer of the elastic requisition stack:
responsive to the pool prescription token, receiving a finalization directive; and
based on the finalization directive, generating a pool requisition token; and
at network interface circuitry, sending the pool requisition token to a host interface for control of database-compute resources.
E12. The method of example E11 or any other example in this table, further including, at the pool layer:
at a time that the union performance score fails to exceed the disunion performance score:
performing a pool revision operation on the candidate pool by:
determining a revised candidate pool by removing a first candidate database of the multiple candidate databases from the candidate pool; and
performing the performance score operation on the revised candidate pool.
E13. The method of example E12 or any other example in this table, further including, at the pool layer:
iteratively performing performance score operations and pool revision operations until:
union performance score exceeds the disunion performance score; or
a current candidate pool includes a single candidate database.
E14. The system of example E12 or any other example in this table, further including, at the pool layer:
determining the first candidate database by identifying a lowest inclusion rank database of the multiple candidate databases.
E15. The method of example E14 or any other example in this table, where the elastic requisition circuitry is further configured to, at the candidate layer:
determining an inclusion rank for each of the multiple candidate databases based on:
the historical multiplexing characteristic for the candidate database;
the predicted multiplexing characteristic for the candidate database;
a complement factor relevant to the candidate database; or
any grouping thereof.
E16. A product including:
machine-readable media other than a transitory signal; and
instructions stored on the machine-readable media, the instructions configured to, when executed, cause a machine to:
at elastic requisition circuitry configured to execute an elastic requisition stack:
at a data input layer of the elastic requisition stack, obtain historical data including data types, the data types including processor utilization type data, operation rate type data, flush volume type data, or any grouping thereof;
at a candidate layer of the elastic requisition stack:
identify multiple candidate databases by:
obtaining a historical multiplexing characteristic for each of the multiple candidate databases via a map of the historical data;
via a deep-learning analysis of the historical data, obtaining a predicted multiplexing characteristic for each of the multiple candidate databases via a map of predicted activity;
identifying a complement factor from among the historical multiplexing characteristics; predicted multiplexing characteristics; or both for the multiple candidate databases, the complement factor consistent with a least one statistical multiplexing efficiency among the multiple candidate databases; and
aggregating the multiple candidate databases into a candidate pool based on the complement factor;

TABLE 9-continued

Examples for each of multiple candidate databases, determine a database-compute tier based on a corresponding activity factor, the corresponding activity factor based on the historical data for the individual one of the multiple candidate databases; and
assign a candidate pool tier consistent with the database-compute tiers of the multiple candidate databases;
at a pool layer of the elastic requisition stack:
perform a performance score operation on the candidate pool by:
computing a disunion performance score for unpooled operation of the individual ones of the multiple candidate databases;
computing a union performance score for pooled operation of the multiple candidate databases; and
at a time that the union performance score exceeds the disunion performance score, generating a pool prescription token for requisition of the candidate pool including the multiple candidate databases;
at a requisition layer of the elastic requisition stack:
responsive to the pool prescription token, receive a finalization directive; and
based on the finalization directive, generate a pool requisition token; and
at network interface circuitry, send the pool requisition token to a host interface for control of database-compute resources.
E17. The product of example E16 or any other example in this table, where the instructions are configured to cause the machine to, at a predictive engine layer of the elastic requisition stack:
perform the deep-learning analysis of the historical data to obtain predicted utilization data including the data types; and
determine the map of predicted activity based on the predicted utilization data.
E18. The product of example E17 or any other example in this table, where the instructions are configured to cause the machine to, at the predictive engine layer, perform the deep-learning analysis of the historical data by training a deep learning algorithm using the historical data to obtain predicted utilization data.
E19. The product of example E16 or any other example in this table, where the instructions are configured to cause the machine to, at a consumption savings layer of the elastic requisition stack:
determine a pool consumption savings based on an amount by which the union performance score exceeds the disunion performance score.
E20. The product of example E19 or any other example in this table, where the instructions are configured to cause the machine to, at a presentation layer of the elastic requisition stack:
generate an elastic-command interface for presentation of the pool consumption savings and an option for the finalization directive.

Various implementations have been specifically described. However, many other implementations are also possible.

What is claimed is:

1. A system including:
elastic requisition circuitry configured to execute an elastic requisition stack, the elastic requisition circuitry configured to:
at a data input layer of the elastic requisition stack, obtain historical data including data types, the data types including processor utilization type data, operation rate type data, flush volume type data, or any grouping thereof;
at a candidate layer of the elastic requisition stack:
identify multiple candidate databases by:
obtaining a historical multiplexing characteristic for each of the multiple candidate databases via a map of the historical data;
via a deep-learning analysis of the historical data, obtaining a predicted multiplexing characteristic for each of the multiple candidate databases via a map of predicted activity;
identifying a complement factor from among the historical multiplexing characteristics; predicted multiplexing characteristics; or both for the multiple candidate databases, the complement factor consistent with a least one statistical multiplexing efficiency among the multiple candidate databases; and aggregating the multiple candidate databases into a candidate pool based on the complement factor;

for each of multiple candidate databases, determine a database-compute tier based on a corresponding activity factor, the corresponding activity factor based on the historical data for the individual one of the multiple candidate databases; and assign a candidate pool tier consistent with the database-compute tiers of the multiple candidate databases;

at a pool layer of the elastic requisition stack:
perform a performance score operation on the candidate pool by:
computing a disunion performance score for unpooled operation of the individual ones of the multiple candidate databases;
computing a union performance score for pooled operation of the multiple candidate databases; and
at a time that the union performance score exceeds the disunion performance score, generating a pool prescription token for requisition of the candidate pool including the multiple candidate databases;

at a requisition layer of the elastic requisition stack:
responsive to the pool prescription token, receive a finalization directive; and
based on the finalization directive, generate a pool requisition token; and network interface circuitry configured to send the pool requisition token to a host interface for control of database-compute resources.

2. The system of claim 1, where the elastic requisition circuitry is further configured to, at the pool layer:
at a time that the union performance score fails to exceed the disunion performance score:
perform a pool revision operation on the candidate pool by: determining a revised candidate pool by removing a first candidate database of the multiple candidate databases from the candidate pool;
perform the performance score operation on the revised candidate pool.

3. The system of claim 2, where the elastic requisition circuitry is further configured to, at the pool layer:
iteratively perform performance score operations and pool revision operations until:
union performance score exceeds the disunion performance score; or
a current candidate pool includes a single candidate database.

4. The system of claim 2, where the elastic requisition circuitry is further configured to, at the pool layer:
determine the first candidate database by identifying a lowest inclusion rank database of the multiple candidate databases.

5. The system of claim 4, where the elastic requisition circuitry is further configured to, at the candidate layer:
determine an inclusion rank for each of the multiple candidate databases based on:
the historical multiplexing characteristic for the candidate database;
the predicted multiplexing characteristic for the candidate database;
a complement factor relevant to the candidate database; or
any grouping thereof.

6. The system of claim 1, where the elastic requisition circuitry is configured to, at a predictive engine layer of the elastic requisition stack:
perform the deep-learning analysis of the historical data to obtain predicted utilization data including the data types; and
determine the map of predicted activity based on the predicted utilization data.

7. The system of claim 6, where the elastic requisition circuitry is configured to, at the predictive engine layer, perform the deep-learning analysis of the historical data by training a deep learning algorithm using the historical data to obtain predicted utilization data.

8. The system of claim 1, where the elastic requisition circuitry is configured to, at a consumption savings layer of the elastic requisition stack:
determine a pool consumption savings based on an amount by which the union performance score exceeds the disunion performance score.

9. The system of claim 8, where the elastic requisition circuitry is configured to, at a presentation layer of the elastic requisition stack:
generate an elastic-command interface for presentation of the pool consumption savings and an option for the finalization directive.

10. The system of claim 1, where the historical multiplexing characteristic, the predicted multiplexing characteristic, or both include a ratio of peak utilization to average utilization.

11. A method including:
at elastic requisition circuitry configured to execute an elastic requisition stack:
at a data input layer of the elastic requisition stack, obtaining historical data including data types, the data types including processor utilization type data, operation rate type data, flush volume type data, or any grouping thereof;
at a candidate layer of the elastic requisition stack:
identifying multiple candidate databases by:
obtaining a historical multiplexing characteristic for each of the multiple candidate databases via a map of the historical data;
via a deep-learning analysis of the historical data, obtaining a predicted multiplexing characteristic for each of the multiple candidate databases via a map of predicted activity;
identifying a complement factor from among the historical multiplexing characteristics; predicted multiplexing characteristics; or both for the multiple candidate databases, the complement factor consistent with a least one statistical multiplexing efficiency among the multiple candidate databases; and
aggregating the multiple candidate databases into a candidate pool based on the complement factor;
for each of multiple candidate databases, determining a database-compute tier based on a corresponding activity factor, the corresponding activity factor based on the historical data for the individual one of the multiple candidate databases; and assigning a candidate pool tier consistent with the database-compute tiers of the multiple candidate databases;
at a pool layer of the elastic requisition stack:
performing a performance score operation on the candidate pool by:
computing a disunion performance score for unpooled operation of the individual ones of the multiple candidate databases;
computing a union performance score for pooled operation of the multiple candidate databases; and
at a time that the union performance score exceeds the disunion performance score, generating a pool prescription token for requisition of the candidate pool including the multiple candidate databases;
at a requisition layer of the elastic requisition stack:
responsive to the pool prescription token, receiving a finalization directive; and
based on the finalization directive, generating a pool requisition token; and
at network interface circuitry, sending the pool requisition token to a host interface for control of database-compute resources.

12. The method of claim 11, further including, at the pool layer:
at a time that the union performance score fails to exceed the disunion performance score:
performing a pool revision operation on the candidate pool by: determining a revised candidate pool by removing a first candidate database of the multiple candidate databases from the candidate pool; and
performing the performance score operation on the revised candidate pool.

13. The method of claim 12, further including, at the pool layer:
iteratively performing performance score operations and pool revision operations until:
union performance score exceeds the disunion performance score; or
a current candidate pool includes a single candidate database.

14. The system of claim 12, further including, at the pool layer:
determining the first candidate database by identifying a lowest inclusion rank database of the multiple candidate databases.

15. The method of claim 14, where the elastic requisition circuitry is further configured to, at the candidate layer:
determining an inclusion rank for each of the multiple candidate databases based on:
the historical multiplexing characteristic for the candidate database;
the predicted multiplexing characteristic for the candidate database;
a complement factor relevant to the candidate database; or
any grouping thereof.

16. A product including:
machine-readable media other than a transitory signal; and
instructions stored on the machine-readable media, the instructions configured to, when executed, cause a machine to:
at elastic requisition circuitry configured to execute an elastic requisition stack:
at a data input layer of the elastic requisition stack, obtain historical data including data types, the data types including processor utilization type data, operation rate type data, flush volume type data, or any grouping thereof;
at a candidate layer of the elastic requisition stack:
identify multiple candidate databases by:
obtaining a historical multiplexing characteristic for each of the multiple candidate databases via a map of the historical data;
via a deep-learning analysis of the historical data, obtaining a predicted multiplexing characteristic for each of the multiple candidate databases via a map of predicted activity;
identifying a complement factor from among the historical multiplexing characteristics; predicted multiplexing characteristics; or both for the multiple candidate databases, the complement factor consistent with a least one statistical multiplexing efficiency among the multiple candidate databases; and
aggregating the multiple candidate databases into a candidate pool based on the complement factor;
for each of multiple candidate databases, determine a database-compute tier based on a corresponding activity factor, the corresponding activity factor based on the historical data for the individual one of the multiple candidate databases; and
assign a candidate pool tier consistent with the database-compute tiers of the multiple candidate databases;
at a pool layer of the elastic requisition stack:
perform a performance score operation on the candidate pool by:
computing a disunion performance score for unpooled operation of the individual ones of the multiple candidate databases;
computing a union performance score for pooled operation of the multiple candidate databases; and
at a time that the union performance score exceeds the disunion performance score, generating a pool prescription token for requisition of the candidate pool including the multiple candidate databases;
at a requisition layer of the elastic requisition stack:
responsive to the pool prescription token, receive a finalization directive; and
based on the finalization directive, generate a pool requisition token; and
at network interface circuitry, send the pool requisition token to a host interface for control of database-compute resources.

17. The product of claim 16, where the instructions are configured to cause the machine to, at a predictive engine layer of the elastic requisition stack:
perform the deep-learning analysis of the historical data to obtain predicted utilization data including the data types; and
determine the map of predicted activity based on the predicted utilization data.

18. The product of claim 17, where the instructions are configured to cause the machine to, at the predictive engine layer, perform the deep-learning analysis of the historical data by training a deep learning algorithm using the historical data to obtain predicted utilization data.

19. The product of claim 16, where the instructions are configured to cause the machine to, at a consumption savings layer of the elastic requisition stack:
   determine a pool consumption savings based on an amount by which the union performance score exceeds the disunion performance score.

20. The product of claim 19, where the instructions are configured to cause the machine to, at a presentation layer of the elastic requisition stack:
   generate an elastic-command interface for presentation of the pool consumption savings and an option for the finalization directive.

\* \* \* \* \*